Dec. 4, 1923.
V. D. HITCHINGS
AUTOMOBILE SCREEN
Filed Aug. 15, 1922
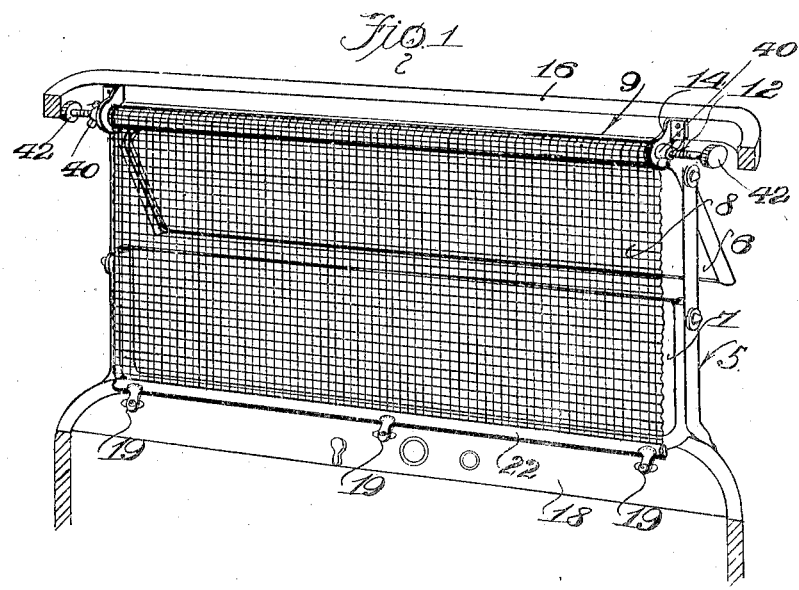
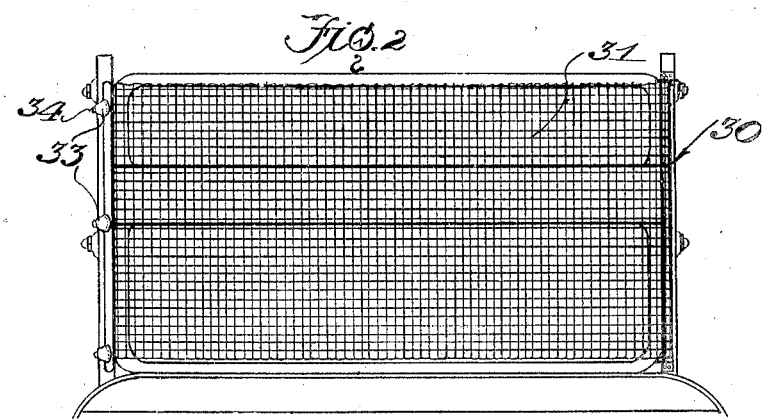
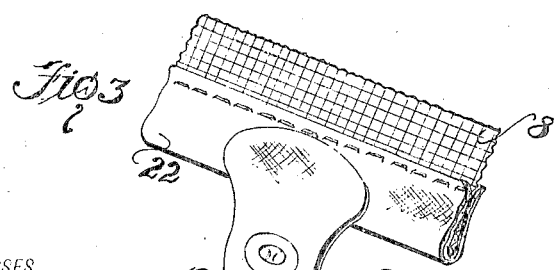
WITNESSES
INVENTOR
V. D. Hitchings
ATTORNEYS Patented Dec. 4, 1923.

1,476,336

UNITED STATES PATENT OFFICE.

VERNON DAVIS HITCHINGS, OF NORFOLK, VIRGINIA.

AUTOMOBILE SCREEN.

Application filed August 15, 1922. Serial No. 581,988.

*To all whom it may concern:*

Be it known that I, VERNON D. HITCH-INGS, a citizen of the United States, and a resident of Norfolk, in the county of Norfolk and State of Virginia, have invented certain new and useful Improvements in Automobile Screens, of which the following is a specification.

This invention relates to shields especially adapted for use on automobiles and other vehicles.

Briefly stated this invention aims to provide simple and reliable means for preventing flying bugs and insects in the path of travel of an automobile from striking the occupants of the automobile thereby causing an annoyance and possibly blinding the operator for the moment.

A further object is to provide a shield which may be applied at one side of the windshield without elaborately altering the construction of the vehicle, marring the appearance of the same or in any way interfering with the vision of the operator.

A further object is to provide a shield of the character specified which is of highly simplified construction, durable in use and cheap to manufacture.

Other objects and advantages will be apparent during the course of the following description.

In the accompanying drawings forming a part of this application and in which like numerals are employed to designate like parts throughout the same, Figure 1 is a perspective illustrating the improved shield applied, Figure 2 is an elevation of a modified form of shield applied, Figure 3 is a fragmentary perspective illustrating the attaching means for one end of the shield.

In the drawing the numeral 5 generally designates the windshield of a motor vehicle, and as illustrated in Figure 1 the windshield consists of upper and lower panes 6 and 7 respectively, either one of which may be adjusted independently of the other.

The improved shield consists of a screen or reticulated body 8 wound about a roller usually designated by the numeral 9 and which is preferably constructed along the lines of the oridnary spring roller for shields. That is to say, the roller is provided with the usual internal spring which when released serves to wind the reticulated body onto the roller. As this construction is old and well known and forms no part of this invention a detailed illustration is believed to be unnecessary.

However, it might be stated that the ends of the rollers are provided with pintles 12 connected in the usual manner to the attaching brackets 14 of which there are two. In the form of the invention illustrated in Figure 1 the brackets 14 are connected to the member 16 extending horizontally, though it is obvious that the brackets may be connected to any suitable part of the automobile without in any way departing from the spirit of the invention.

Figure 1 illustrates that the roller 9 extends horizontally at a point adjacent the upper edge of the windshield and the screen or reticulated body may be drawn downwardly and attached to the dash 18 or other convenient part of the automobile through the medium of attaching ears 19 and buttons 20. Of course, other suitable fastening devices may be employed if desired. In carrying out the invention it is preferred to bind the lower end of the screen 8 as indicated at 22 so that the same will not unravel.

In the form of the invention illustrated in Figure 2 the roller 30 is arranged vertically and the screen 31 wound about the same is moved in a horizontal path across the windshield and is attached at one end to one side of the windshield through the medium of the fastening ears 33 and the coacting fastening device 34.

When the improved shield is positioned either as illustrated in Figures 1 or 2 flying bugs or various insects in the path of travel of the automobile cannot strike the occupants of the automobile and possibly temporarily blind the operator. Also the improved shield will act in a measure as a means to prevent the glaring lights of an approaching automobile from temporarily blinding the operator of the vehicle.

It will also be observed that the improved shield does not in any way interfere with the adjustment of the windshield and does not interfere with the view of the operator. When desired the fastening devices at the end of the reticulated shield may be released and the shield wound onto the roller. When the shield is not in use it is so positioned that it will not be highly visible and will not prevent the windshield from being adjusted.

The improved roller may be held in a set position by means of a winged nut 40 which as illustrated in Figure 1 is threaded on the spindle 12. When the winged nut 40 is advanced into engagement with the adjacent bracket 14 the roller cannot rotate. Therefore, should the wind pressure be strong it cannot blow the screen rearwardly out of the position illustrated in Figure 1.

It will be observed also that the end of each pintle 12 is formed with a knob 42 by means of which the roller may be manually turned. If the spring within the roller is weak or does not work satisfactory the screen may be wound upon the roller or unwound by simply turning the knob 42.

While I have herein shown and described the preferred form of my invention I wish it to be understood that I am aware of the fact that the construction, combination and arrangement of parts may be changed by those skilled in the art without departing from the spirit of the invention as indicated by the appended claim.

Having thus described the invention what is claimed is:—

A shield for automobiles comprising a spring roller provided with threaded pintles having manually controlled knobs, brackets rotatably supporting said pintles, a screen carried by said roller and having one end provided with fastening means, and winged nuts threaded on said pintle outwardly of the brackets and adapted to bind against the brackets whereby to securely hold the roller against turning under wind pressure on the screen.

VERNON DAVIS HITCHINGS.